No. 777,034. PATENTED DEC. 6, 1904.
O. LASCHE.
CONTROLLING DEVICE FOR ELECTRICALLY PROPELLED VEHICLES.
APPLICATION FILED NOV. 4, 1901.
NO MODEL. 2 SHEETS—SHEET 1.

WITNESSES:
Ellis Owen.
Kathleen King.

INVENTOR.
Oskar Lasche
by W. E. Evans
Attorney.

No. 777,034.

Patented December 6, 1904.

UNITED STATES PATENT OFFICE.

OSKAR LASCHE, OF BERLIN, GERMANY, ASSIGNOR TO GENERAL ELECTRIC COMPANY, A CORPORATION OF NEW YORK.

CONTROLLING DEVICE FOR ELECTRICALLY-PROPELLED VEHICLES.

SPECIFICATION forming part of Letters Patent No. 777,034, dated December 6, 1904.

Application filed November 4, 1901. Serial No. 81,148. (No model.)

*To all whom it may concern:*

Be it known that I, OSKAR LASCHE, a subject of the German Emperor, residing at 13 Bachstrasse, Berlin, in the Empire of Germany, have invented a new and useful Controlling Device for Electrically-Propelled Vehicles, of which the following is a specification.

Heavy-traffic electric railways necessitate the employment of motor-carriages carrying more than one motor, so that they may quickly attain a predetermined rate of speed. In starting, these motors have a great strain to overcome, while when traveling at normal speed or downhill the amount of current consumed by the motors becomes less. Now in order to secure the highest possible useful effect and to save the power wasted by the several motors in running idle fewer motors are conveniently brought into operation for the purpose of generating the diminished amount of power which is required. To this end it should be feasible to switch the desired number of motors out of circuit whenever the actual expenditure of current has decreased, and, conversely, in ascending gradients it will be necessary to switch the whole or part of those motors into circuit again to avoid overloading the limited number of motors which are in operation already. In addition to this, all the motors have to be protected from overloading, and this is generally effected by the employment of a maximum cut-out adapted electrically to disconnect all the motors at the same time and to be operated by hand only.

Now the object of this invention is to enable all or any of the motors to be cut out whenever required by means of automatic mechanism operating independently of any interference on the part of the driver, and thereby to provide for the economical consumption of current.

Figure 1:
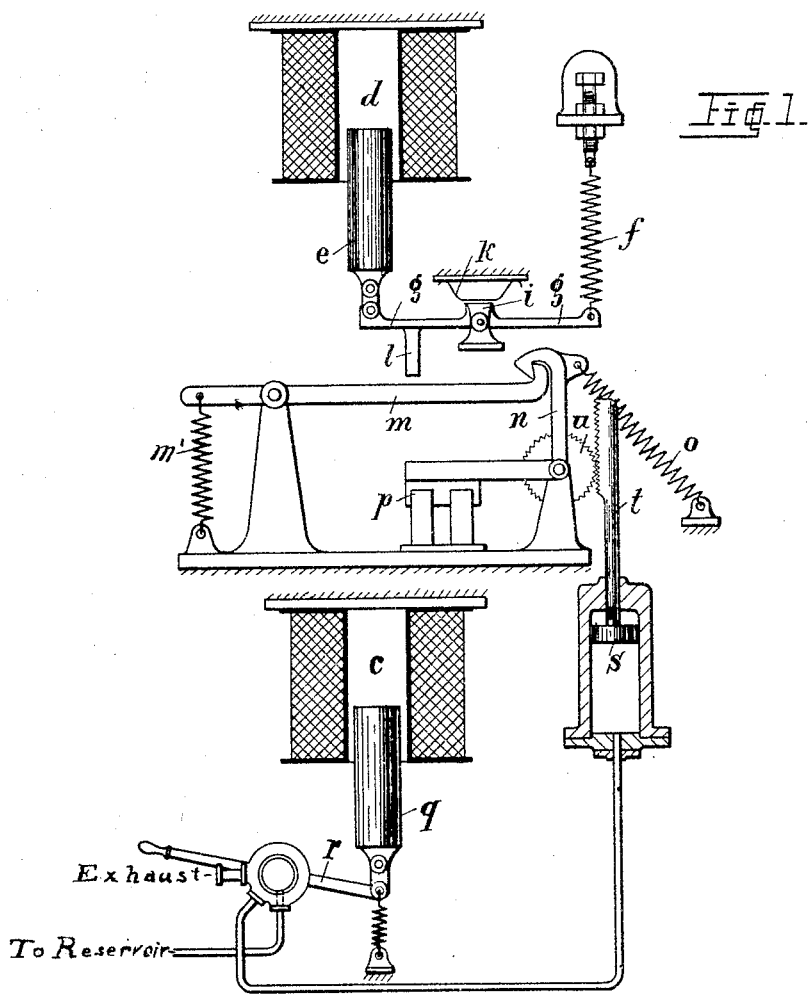
Figure 2:
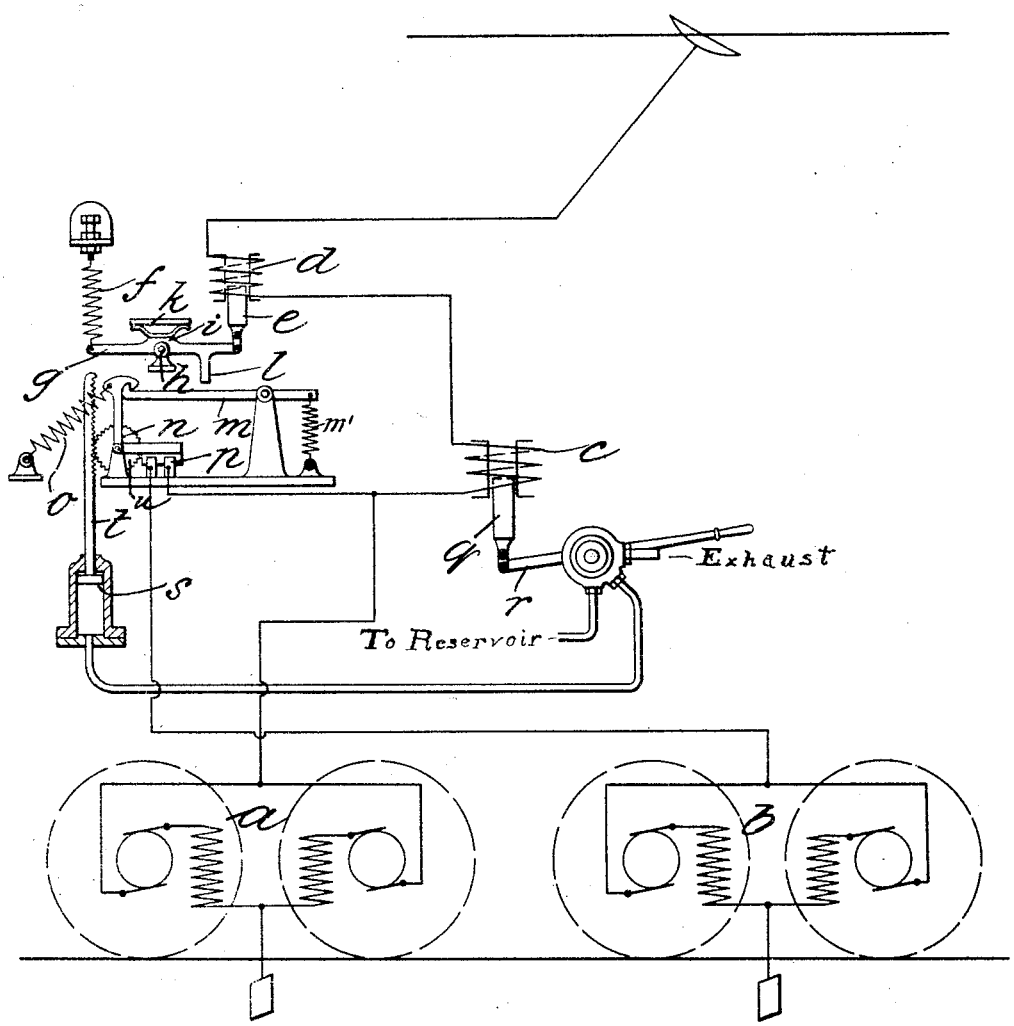

Mechanism constructed with this object in accordance with the invention herein described is represented in Figure 1 of the accompanying drawings, while Fig. 2 illustrates the apparatus with the electric circuits indicated from the source of supply through the different cars through the motors $a$ to ground and through the cut-out switch $p$ and through the motors $b$ to ground.

As illustrated in Figs. 1 and 2, there are assumed to be two series of motors $a$ and $b$, each series being supposed, by way of illustration, to comprise two motors connected in parallel in a three-wire circuit common to both. The maximum cut-out $c$ is in the main circuit in series with the minimum cut-out $d$.

The operation is as follows: The construction of the coil $d$, Fig. 1, is such that while current is being expended by the motors $b$ at the normal rate the iron core $e$ maintains the spring $f$ in a state of equilibrium. The double-armed lever $g$, pivoted by one arm, supports the said iron core $e$ and by the other the spring $f$, both being adjustable according to predetermined amperages. Rigidly connected with the double-armed lever $g$ is a projecting piece $i$, supporting a level surface. This surface is adapted to rest against the spring $k$, and thus to deaden the vibrations which occur when the iron core $e$ is attracted, as a result of the impulses of current. Besides, this plane surface and the spring $f$ afford the means of providing for differences of current arising in consequence of the switching out and switching in of the other series of motors $b$, Fig. 2. When the expenditure of current has reached a given minimum, but not before, the tension of the spring $f$ overcomes the attractive force of the coil $d$ and the friction between the surface $i$ and the spring $k$, so that the projection $l$ will depress the horizontal lever $m$ against the action of the spring $m'$ and release the bell-crank lever $n$. The spring $o$, which is thus strained, now comes into operation. It breaks the circuit at the contact-point $p$, and consequently cuts out of the circuit the second series of motors $b$, so that now all the work to be performed devolves upon the first series $a$. As regards the coil $c$, it lies in the circuit of the series of motors $a$ and is so constructed that the iron core $q$ becomes attracted the moment the load of the said motors attains a given maximum. By the movement of the iron core $q$ a lever $r$ is set in motion, and this lever, through the intermediate agency of compressed air or water under pressure and by means of the piston s, rack t, and toothed wheel u, closes the circuit once more at the contact-point p. The series of motors b is now again supplied with current, so that all the motors available once more perform their share of the work. The same result might be attained by the aid of compressed air, water under pressure, an auxiliary motor, or the like. The moment contact has been made at p the series of motors b again receive current and the coil d draws the lever g back to its original—i. e., horizontal—position.

What I claim as new, and desire to secure by Letters Patent, is—

1. In apparatus for switching electric motors in and out of circuit, means for automatically putting out of circuit one or more individual motors or series of motors on the expenditure of a minimum current, and means for automatically putting into circuit such motor or motors when the motors receiving current become overloaded, substantially as hereinbefore described.

2. In apparatus for switching electric motors in and out of circuit, a number of individual motors or series of motors, a minimum cut-out in the main circuit, and a switch-operating device actuated upon the expenditure of a maximum current, said switch-operating device being in the circuit of the individual motor or series of motors which is not cut out, substantially as hereinbefore described.

3. In apparatus for switching electric motors in and out of circuit, a number of individual motors or series of motors, a coil in the main circuit, said coil controlling a core, a double-armed lever to which said core is connected at one end, and a spring counteracting said core and connected to said lever at the other end, means for breaking the circuit on the movement of said core and lever, and a switch-operating device in the circuit of the motor or series of motors which is not cut out, said device being actuated on the expenditure of a maximum current, substantially as hereinbefore described.

4. In apparatus for switching electric motors in and out of circuit, a number of individual motors or series of motors, a coil in the main circuit, said coil controlling a core, a double-armed lever to which said core is connected at one end, and a spring counteracting said core, and connected to said lever at the other end, there being a level surface on said lever, a spring coacting with the level surface to deaden vibrations, means for breaking the circuit on the movement of said core and lever, and a switch-operating device in the circuit of the motor or series of motors which is not cut out, said device being actuated on the expenditure of a maximum current, substantially as hereinbefore described.

5. In apparatus for switching electric motors in and out of circuit, a switch in the main circuit, a coil in the same circuit, said coil controlling a core, means for opening the switch on the movement of said core due to a minimum expenditure of current, and means for closing said switch when the motors receiving current become overloaded, substantially as hereinbefore described.

6. In apparatus for switching electric motors in and out of circuit, an individual motor or series of motors, a switch in the circuit of said motor or motors, said switch being operated by a bell-crank lever, a pawl-lever normally holding the switch closed, a spring tending to turn the bell-crank lever, means for depressing the pawl-lever on the expenditure of a minimum current to permit of the spring turning the bell-crank lever, and means for closing the switch on the expenditure of a maximum current in the circuit of the motors not cut out, substantially as hereinbefore described.

7. In apparatus for switching electric motors in and out of circuit, a switch in the main circuit, said switch being operated by a bell-crank lever, a pawl-lever normally holding the switch closed, a coil in the circuit of the switch, a core controlled by said coil, a double-armed lever to which said core is connected at one end, and a spring counteracting said core, and connected to said lever at the other end, a projection on said lever for engaging with the pawl-lever on the movement of the core, due to the expenditure of a minimum current in the circuit, a spring for turning the bell-crank lever on the release of the pawl-lever, and means for closing the switch on the expenditure of a maximum current in the circuit of the motors not cut out, substantially as described.

8. In apparatus for switching electric motors in and out of circuit, a minimum cut-out in the main circuit, a coil in the circuit of the motor or series of motors not cut out, said coil controlling a core, a switch in the circuit of the motor or motors to be cut out, and means for closing said switch on the movement of said core due to the expenditure of a maximum current in the circuit of the motors not cut out, substantially as described.

9. In apparatus for switching electric motors in and out of circuit, a minimum cut-out in the main circuit, a coil in the circuit of the motor or series of motors not cut out, said coil controlling a core, a switch in the circuit of the motor or motors to be cut out, a lever closing said switch, a rack-and-pinion device for operating said lever to close the switch, said rack-and-pinion device being actuated upon the movement of said core, due to the expenditure of a maximum current in the circuit of the motor or motors not cut out, substantially as described.

10. In apparatus for switching electric motors in and out of circuit, a minimum cut-out in the main circuit, a coil in the circuit of the motor or series of motors not cut out, said coil controlling a core, a switch in the circuit of the motor or motors to be cut out, a lever closing said switch, a rack-and-pinion device for operating said lever to close the switch, said rack being provided with a piston sliding within a cylinder, a connection between said cylinder and a valve, and between said valve and a fluid-pressure supply, said valve being opened on the movement of said core due to the expenditure of a maximum current in the circuit of the motor or motors not cut out, admitting fluid-pressure to the cylinder, substantially as hereinbefore described.

11. In apparatus for switching electric motors in and out of circuit, a coil in the main circuit, said coil controlling a core, a double-armed lever to which said core is connected at one end, and a spring counteracting said core and connected to said lever at the other end, a switch in the same circuit as the coil, a bell-crank lever closing said switch, a pawl-lever maintaining said switch closed, means for releasing said pawl-lever on the movement of the double-armed lever on the expenditure of a minimum current in the circuit of the motor or motors to be cut out, a spring for opening said switch, and a rack-and-pinion device for closing it, a coil in the circuit of the motor or motors not cut out, a core controlled by said coil, said rack-and-pinion device being operated to close the switch on the movement of said core, due to the expenditure of a maximum current in the circuit of the motor or motors not cut out, substantially as described.

12. In apparatus for switching electric motors in and out of circuit, a coil in the main circuit, said coil controlling a core, a double-armed lever to which said core is connected at one end, and a spring counteracting said core and connected to said lever at the other end, a switch in the same circuit as the coil, a bell-crank lever closing said switch, a pawl-lever maintaining said switch closed, means for releasing said pawl-lever on the movement of the double-armed lever on the expenditure of a minimum current in the circuit of the motor or motors not cut out, a spring for opening said switch, and a rack-and-pinion device for closing it, a piston on the rack, said piston sliding within a cylinder, a valve, a connection between the valve and the cylinder and between the valve and a fluid-pressure supply, a core operating said valve, a coil controlling said core, said coil being in the circuit of the motor or motors cut out, substantially as described.

In testimony whereof I have hereunto signed my name to this specification in the presence of two subscribing witnesses.

OSKAR LASCHE.

Witnesses:
 WOLDEMAR HAUPT,
 HENRY HASPER.